March 7, 1950     A. M. ANDREWS     2,500,053
METHOD OF JOINING PIECES OF PLASTIC
Filed May 14, 1947     2 Sheets-Sheet 1
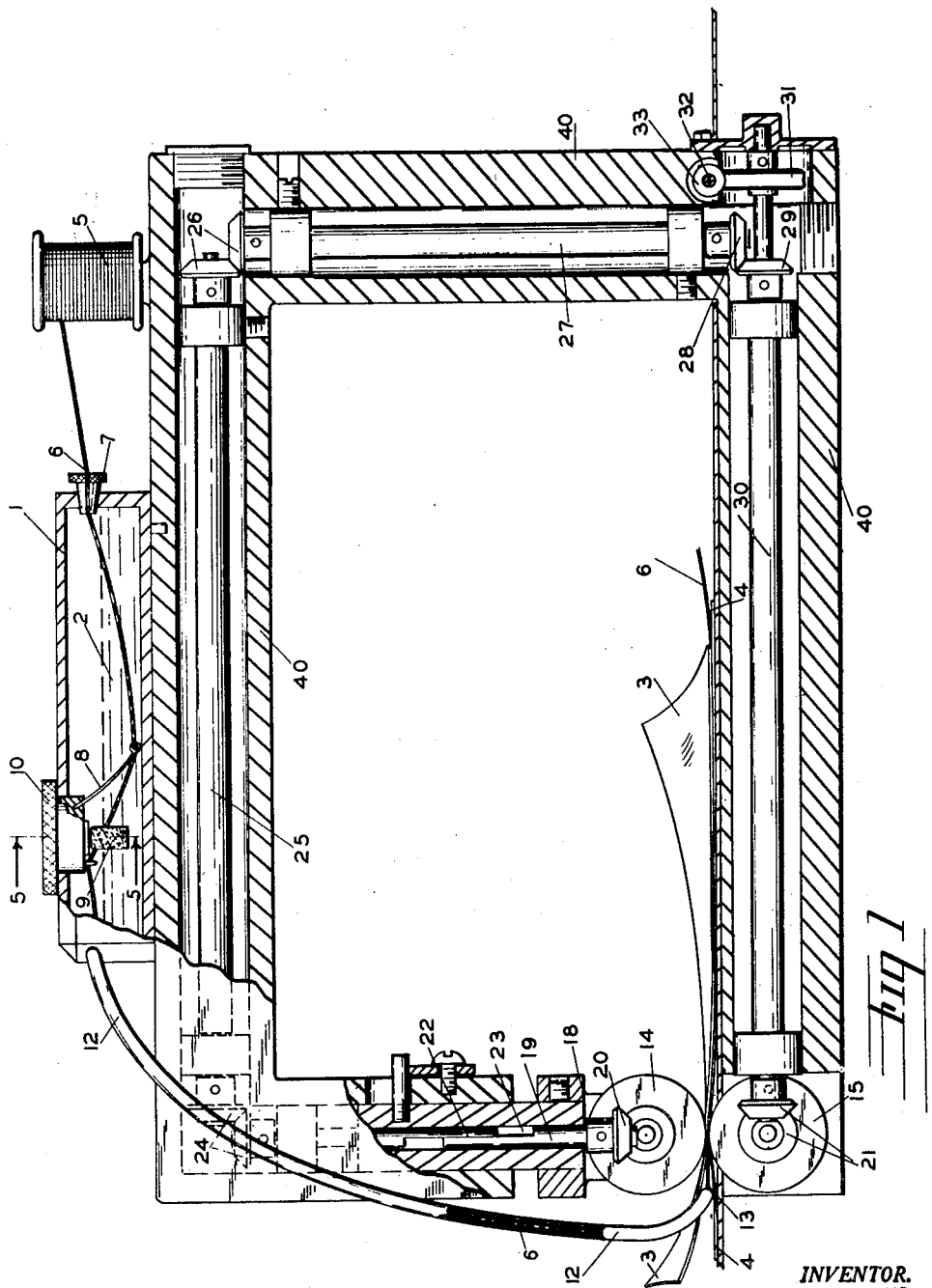
INVENTOR.
ALVADORE M. ANDREWS
BY
ATTORNEY

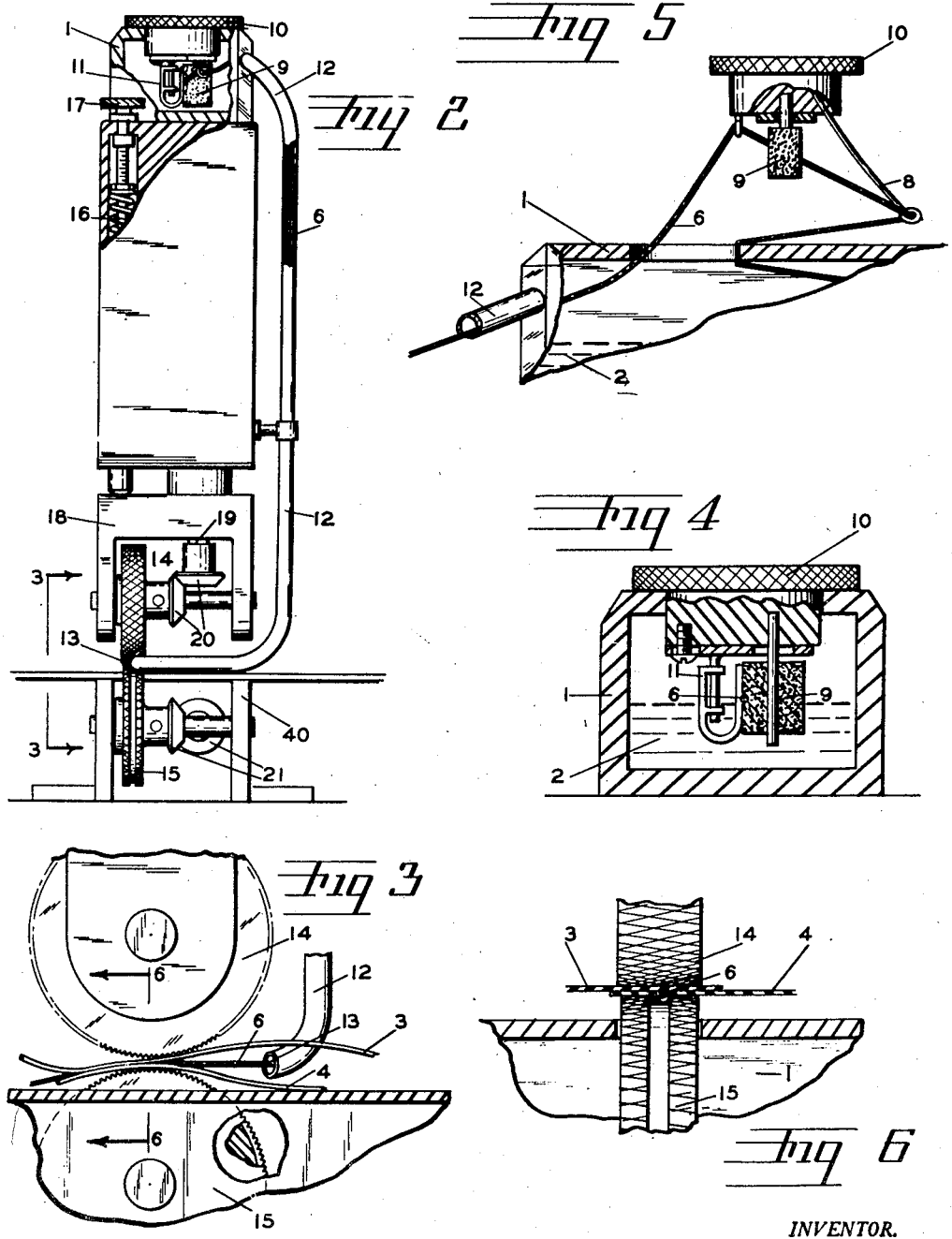

Patented Mar. 7, 1950

2,500,053

UNITED STATES PATENT OFFICE 2,500,053

METHOD OF JOINING PIECES OF PLASTIC

Alvadore M. Andrews, Portland, Oreg.

Application May 14, 1947, Serial No. 747,960

8 Claims. (Cl. 154—116)

This invention relates to apparatus and method for joining pieces and parts of Vinylite resin a very flexible plastic, into forms, such as receptacles, garments and for other uses which are very numerous. Trade names, with and without variation of formulae are numerous.

The flexible, waterproof plastics of the general class, known by various trade names and sometimes varying somewhat in composition and characteristics can be joined by electronic heating, but the apparatus is very expensive and the required overlap of the "seams" (a term adopted for use herein for lack of a more descriptive one), is excessive for technical reasons. Other ways of application of heat may also be found operative.

It is an object of the present invention to employ a solvent instead of a cement, applied in such accurately measured quantities, that it does not dissolve its way through sheets being joined; works to produce a straight even seam and results in what may be called a double seam with a very narrow strip of uncemented space between them, the combined seams shortly developing a strength equal to the strength of a sheet of the plastic material without the use of applied heat, though heat will expedite union. The best, and most economical way that I now know of to perform this operation is by employment of a simple machine, which I will first describe and show by illustrations.

Drawings accompany and form a part of this specification, in which:

Fig. 1 is a side elevation of the machine, partly sectioned to display its construction, which will be explained;

Fig. 2 is a left hand end view of the structure shown in Fig. 1;

Fig. 3 is an enlarged view of that part of Fig. 2 indicated by the viewpoint 3—3 in Fig. 2;

Fig. 4 is an enlargement for clarity of the upper part of Fig. 2, referred to hereinafter as the "stripper";

Fig. 5 is an enlargement of a portion of Fig. 1 indicated by the line 5—5 of that figure; and Fig. 6 is a section taken at 6—6 of Fig. 3.

Describing the drawings in greater detail: This machine, as constructed for testing, illustrated in Fig. 1 by elevation, is of the general form of the well known sewing machine, with its work table and arch, but this form was adopted merely as a convenient one and is only one of a very large number of forms that can serve the purpose as well, and it may later be found that another is better.

The essential parts are a reservoir within which is a charge of solvent 2, to be described in detail hereinafter. The solvent or bond effecting liquid 2 is to be applied in minute but continuous amount between two sheets of plastic 3 and 4 in order to bond the sheets 3 and 4 together as strongly as a continuous sheet, bearing in mind that an over-supply can cut through the sheets and that to work satisfactorily, atmosphere must be allowed to come in contact with the solvent for an exceedingly brief interval.

This is accomplished by employing a supply of absorbent thread represented by the spool 5 from which a strand 6 is led through a suitable bushing 7 to the interior of the reservoir 1 and caused to travel through the charge of solvent 2 where it is soaked in solvent, the guide wire 8 being a structure for keeping it submerged.

Since the amount of solvent can be and is gauged by the size of the thread and the amount it will absorb, a stripper felt 9 is supported by the filler plug 10 and a tension spring 11 is positioned adjacent the felt 9 being also supported by the plug 10, the thread 6 is passed between the felt 9 and the spring 11 at a point above the level of solvent in the reservoir and surplus solvent is stripped off, whereupon the thread with its soaked up solvent passes through the tube 12 to a point such as 13, where it passes, almost completely free from atmosphere contact, between the sheets of plastic 3 and 4 to make a seam. It makes the "seam" because as it passes, with the thread, between sheets 3 and 4, the thread with its solvent and the two sheets 3 and 4 pass between the rollers 14 and 15, the first named being spring pressed against the second and the material between them by the spring 16, the tension of which may be varied by the tension screw 17.

The upper roller 14 is mounted on the carrier 18, is positively driven by the shaft 19 and the bevel gear pair 20. The lower roller 15 will be driven at synchronous speed by the bevel gear pair 21. A shaft 22 which is telescopically made in two parts as shown at 23, Fig. 1, receives power through the bevel gear pair 24, the shaft 25, the bevel gear pair 26, shaft 27, the bevel gear 28, in mesh with gear 29 on shaft 30 driven by the worm wheel 31, operated by the worm 32, the shaft of which, 33, shown in section will stand for a variable speed motor, not shown as it, with a proper control is entirely conventional, all being mounted on the frame 40. The shafting, gearing and auxiliary parts are also convention as stated, but are illustrated to show a causal nexus between the drive and the rollers 14 and 15, the latter being grooved so that the thread does not carry all of the pressure, leaving some for the sheets.

The mode of operation is this; as the thread 6 with its carefully metered supply of solvent passes between the sheets of plastic and the whole passes between the rollers 14 and 15, the thread is squeezed practically dry by the pressure transmitted through the roller 14 from the spring 16 and this burden of solvent is about equally spread, laterally on both sides of the thread and bonds the sheets together in a double seam, spaced apart the width of the thread as flattened. The thread is not bonded to either sheet, as apparently the bond, which in some respects partakes of the nature of a weld at low temperature, requires softening and subsequent congealing of the actual substance of the plastic sheets, hence the thread cannot bond to either one. After the thread is soaked or saturated with solvent, and the surplus solvent stripped from the surface thereof, the evaporation of the solvent from the thread is restricted until it is fed between the sheets and which is accomplished by closely enclosing the thread within the tube 12.

The plastic sheet is quite stretchable, somewhat like but less than a like thickness of soft rubber and is much stronger and a sharp pull lengthwise of the seam will break the thread in one or more places, restoring the stretchability in that direction if it is important. If the end of the thread projects beyond the edges of the plastic it can be easily pulled out after breaking. Alternatively, the thread itself may be of plastic of closely related composition that will swell a small amount and at the same time adhere to both sheets when pressed thereagainst; in which case the groove in one of the wheels will be omitted.

I will now describe the plastic material, a commercial product and the solvent, of which a number are available. It is not believed that the employment of solvent to "seam" or bond two sheets together in making useful articles from the type of plastic has been regarded as feasible. The plastic material that I have had the greatest success with is polyvinyl resin also known by trade names in variety. The solvents that may be used for the named substance may be methyl ethyl ketone plus a small amount of propylene oxide. According to the widely varying substances falling within the broad class of polyvinyl resins, different solvents, within the knowledge of chemical art may be used.

In the foregoing specification the word plastic is employed as a definition of any of the substances amendable to treatment and susceptible to what may be called chemical welding by a measured amount of solvent with concurrent application of pressure. Solvent is intended to include any substance that will serve the functions described.

It is also of advantage to dissolve a small amount of the polyvinyl alcohol plastic material itself in the solvent since such a combination makes a fuller seam without, at least impairing the speed of operation; in fact it is thought to accelerate setting. Other plastics that are available may be varieties of the following: Polyvinyl or vinyl resins or plastics include polyvinyl alcohol, polyvinyl acetate, polyvinyl chloride, preferably vinyl chloride-vinyl acetate copolymer ("vinylite") and the like. Solvents for these resins are numerous and well known to those skilled in the art, but examples include acetone, mesityl oxide, methyl isobutyl ketone, propylene oxide methyl n-amyl ketone, cyclic ketones and the like, the solvent activity varying somewhat according to the resin, the brand of resin and grade, and such physical conditions as the temperature.

Having disclosed my invention so that those familiar with the synthetic plastic arts can make use of its teaching, what I claim as new and desire to secure by Letters Patent is:

1. The method of bonding two sheets of flexible plastic together, which comprises providing a solvent for the plastic, soaking a thread of predetermined absorptive capacity with said solvent, stripping off surplus solvent from the thread, laying the end of the thread with its measured amount of contained solvent between two sheets to be bonded together, while substantially protecting the solvent containing thread from atmosphere feeding the sheets and the thread continuously forward at the same speeds, then concurrently applying pressure to the sheets with the contained thread and solvent in sufficient degree to express the solvent laterally on both sides of the thread to make two weld-like bonds parallel to each other, the thread being left in place while the bond is being made.

2. The method of bonding two sheets of flexible plastic together, which comprises providing a solvent for the plastic, passing a thread of predetermined absorptive capacity through a body of said solvent to soak the thread therewith, stripping off surplus solvent from the thread, laying the end of the thread with its measured amount of contained solvent between two sheets to be bonded together, while substantially protecting the solvent containing thread from atmosphere feeding the sheets and the solvent carrying thread forward at a coordinate speed, then concurrently applying pressure to the sheets with the contained thread and solvent in sufficient degree to express the solvent laterally on both sides of the thread to make a weld-like bond of the material of the sheets.

3. The method of joining two pieces of plastic by a seam-like bond which consists of the following steps, selecting a liquid solvent to which the plastic sheets to be joined are amenable, soaking a thread that is absorptive of said solvent, protecting the thread with its absorbed solvent from contact with atmosphere after soaking and until it is laid, laying the thread between the pieces of plastic where the bond is desired and immediately applying pressure to the sheets and the thread therebetween.

4. The method of joining sheets of like material together by softening to plasticization the contacting areas of the sheets with a chemical softener in the necessary amount, which consists in selecting an absorptive thread having the correct capacity, passing it through a body of the chemical, stripping the excess chemical off the surface of the thread, carrying the thread with its absorbed quantity of chemical to a joint where the thread is placed by an end thereof between the sheets to be joined while protecting the thread against atmosphere contact after it is stripped and before it is passed between the sheets and concurrently applying pressure to an elongated seam-like area of said sheets with the thread therebetween to express the absorbed quantity of chemical out of the thread and into contact with the adjacent sides of the sheets of material, as a continuing operation.

5. The method of accurately measuring the correct amount of chemical required to soften sheets of material to be pressed together to form a seam-like bond, which consists in selecting a thread having absorptive capacity in the correct amount, passing the thread through a body of the chemical, stripping the thread of surface carried chemical, protecting the thread against atmosphere and passing the free end of the chemical charged thread at the beginning of the seam-like bond and feeding the thread forward with the same speed as the sheets and concurrently applying pressure to the sheets with the thread therebetween to make the chemical available and pressing the sheets together.

6. The method of accurately measuring a critically accurate amount of softening chemical needed in making a weld like pressure joinder of a pair of sheets of material to be joined, which consists of passing an absorptive thread through a body of such chemical, removing excess chemical that may be surface carried from said thread, passing the thread under protection against atmosphere evaporation to a point immediately before the sheets pass under the influence of joining pressure, feeding the thread in at the same speed as the sheets and leaving the thread in the joinder.

7. The method of bonding together a pair of sheets of material comprising steps of passing a continuous length of thread through a body of bond effecting liquid to cause said thread to pick up liquid continuously therefrom, bringing said pair of sheets together, applying pressure to the opposite sides of said pair of superposed sheets at a pair of opposed points while feeding said pair of sheets continuously between said points of application of pressure, passing said thread from said body to a position between said sheets aligned with said points of application of pressure, and restricting evaporation of liquid from said thread between said body and the point where it is fed between said sheets ahead of said points of application of pressure by closely enclosing said thread throughout the distance from said body of liquid to said point where it is fed between said sheets.

8. The method of bonding together a pair of sheets of material comprising the steps of passing a continuous length of an absorptive thread through a body of bond effecting liquid to cause said thread to become saturated therewith, stripping the excess liquid from the surface of said thread upon emergence from said liquid body, bringing said pair of sheets together and while doing so passing said thread therebetween, applying pressure to the opposite sides of said pair of superposed sheets at a pair of opposed points while feeding said pair of sheets continuously between said points of application of pressure, the liquid absorptively contained by said thread being expressed therefrom upon said application of pressure for effectively bonding said sheets together, restricting evaporation of liquid from said thread between said body of liquid and the point where it is fed between said sheets immediately ahead of said points of application of pressure by closely enclosing said thread throughout the entire distance from said liquid body to said point where it is fed between said sheets.

ALVADORE M. ANDREWS.

REFERENCES CITED

The following references are of record in the file of this patent:

UNITED STATES PATENTS

| Number | Name | Date |
|---|---|---|
| 1,841,539 | Kleinschmit | Jan. 19, 1932 |
| 1,881,438 | Fischer | Oct. 11, 1932 |
| 1,899,067 | Trumbull | Feb. 28, 1933 |
| 2,057,029 | Johnstone | Oct. 13, 1936 |
| 2,060,906 | Snyder | Nov. 17, 1936 |
| 2,335,159 | Salfisberg | Nov. 23, 1943 |
| 2,343,975 | Hosfield | Mar. 14, 1944 |
| 2,384,462 | Goodman | Sept. 11, 1945 |
| 2,460,390 | McDermott | Feb. 1, 1949 |

Certificate of Correction

Patent No. 2,500,053                                       March 7, 1950

ALVADORE M. ANDREWS

It is hereby certified that error appears in the printed specification of the above numbered patent requiring correction as follows:

Column 4, line 67, for the word "joint" read *point*;

and that the said Letters Patent should be read with this correction therein that the same may conform to the record of the case in the Patent Office.

Signed and sealed this 4th day of July, A. D. 1950.

[SEAL]

THOMAS F. MURPHY,
*Assistant Commissioner of Patents.*